United States Patent
Neijzen et al.

[11] Patent Number: 5,929,956
[45] Date of Patent: Jul. 27, 1999

[54] REFLECTION TYPE DIFFUSING LIQUID CRYSTAL DISPLAY WITH SELECTIVE REFLECTING MEANS LOCATED BETWEEN THE SUBSTRATES

[75] Inventors: Jacobus H. M. Neijzen; Hugo J. Cornelissen, both of Eindhoven, Netherlands

[73] Assignee: U.S Philips Corporation, New York, N.Y.

[21] Appl. No.: 08/976,709

[22] Filed: Nov. 24, 1997

[30] Foreign Application Priority Data

Nov. 28, 1996 [EP] European Pat. Off. .............. 96203371

[51] Int. Cl.$^6$ ................................... G02F 1/1335
[52] U.S. Cl. ............................. 349/113; 349/114; 349/86
[58] Field of Search ..................... 349/113, 114, 349/115, 86

[56] References Cited

U.S. PATENT DOCUMENTS

| | | | |
|---|---|---|---|
| 3,910,681 | 10/1975 | Elliott et al. | 350/160 |
| 5,188,760 | 2/1993 | Hikmet et al. | 252/299.1 |
| 5,399,390 | 3/1995 | Akins | 428/1 |
| 5,408,344 | 4/1995 | Takiguchi et al. | 359/40 |
| 5,523,862 | 6/1996 | Narita et al. | 359/49 |
| 5,594,560 | 1/1997 | Jelley et al. | 359/15 |
| 5,691,790 | 11/1997 | Havens et al. | 349/113 |

FOREIGN PATENT DOCUMENTS

| | | |
|---|---|---|
| 0451905A1 | 10/1991 | European Pat. Off. . |
| 4-134323 | 5/1992 | Japan . |

OTHER PUBLICATIONS

"Optimization of holographic PDLC for reflective color display applications" by K. Tanaka et al. in SID 95 Digest, pp. 267–270.

"A novel polymer film that controls light transmission" by M. Honda et al. in Progress in Pacific Polymer Science 3 (1994), pp. 159–169.

Primary Examiner—William L. Sikes
Assistant Examiner—Robert J. Hollingshead
Attorney, Agent, or Firm—F. Brice Faller

[57] ABSTRACT

The invention relates to a reflective flat-panel display device (1) comprising a display panel (3) which is suitable for modulating an illumination beam with image information. The display panel (3) comprises a diffusing liquid crystalline material (5) and a first and a second substrate (7, 9) enclosing the liquid crystalline material (5) and reflecting means which reflect light incident at an angle which is larger than a given angle of incidence $\theta_c$. The device further includes an absorbing element (10) which absorbs light passed by the reflecting means.

10 Claims, 6 Drawing Sheets

REFLECTION TYPE DIFFUSING LIQUID CRYSTAL DISPLAY WITH SELECTIVE REFLECTING MEANS LOCATED BETWEEN THE SUBSTRATES

BACKGROUND OF THE INVENTION

The invention relates to a reflective flat-panel display device comprising a display panel which is suitable for modulating an illumination beam with image information, the display panel comprising a diffusing liquid crystalline material and a first and a second substrate enclosing the liquid crystalline material, the display device also comprising an absorbing element.

In reflective display devices having a diffusing display panel, it is relatively difficult to render the black state and the white state sufficiently black and white, respectively. Generally, the transparent state of the panel is used to realize the black state by providing an absorbing element on the side of the display panel facing away from the incident light. However, this has the result that the white state is not sufficiently bright. To obtain a bright white state, a reflector is required which reflects the light forwardly diffused by the active layer of the display panel into the viewing direction. When, for example a metallic mirror is used for this reflector, a very bright white state can be realized, but this is at the expense of the black state.

A reflective flat-panel display device of the type described in the opening paragraph is known from, for example U.S. Pat. No. 5,408,344. In the display device described in this Patent, the above-mentioned problem is solved by providing a prism plate outside the display panel. One part of the light incident on the prism plate is reflected, whereas the other part of the light will be transmitted by the prism plate so as to be subsequently absorbed by an absorbing element.

A drawback of the display device known from said United States Patent is that shadow images will occur in the case of a directed illumination. Moreover, an external reflector requires a large aperture. If the aperture is not maximal, due to, for example the presence of a black mask, the effect of the external reflector and consequently the luminance rapidly decrease. This is caused by the fact that the reflections on the glass-air interface and the external reflector occur behind the pixels so that a black mask is to be passed through twice.

SUMMARY OF THE INVENTION

It is an object of the invention to provide a bright reflective flat-panel display device in which the above-mentioned problems are obviated. To this end, the display panel includes means which reflect light which is incident at an angle of incidence which is larger than a given angle of incidence $\theta_c$.

Since the means are present within the display panel, the occurrence of shadow images is reduced considerably. Since only light from a given angle of incidence will be reflected, substantially perpendicularly incident light will be mainly passed towards the absorbing element where it will consequently be absorbed. In this way, the black state, i.e. the case for the transparent state of the pixels of the liquid crystalline material, will be very satisfactory to the viewer watching the exit face of the display panel within a given viewing angle. Moreover, the white state, i.e. the case for the diffusing state of the pixels of the liquid crystalline material, will be optimized because the means behave as a reflector for angles outside the viewing angle. Moreover, it is sufficient to use a relatively thin liquid crystalline layer.

In a first embodiment of the reflective flat-panel display device according to the invention the means for reflecting light includes an angle-dependent reflector which is situated between the liquid crystalline material and the second substrate.

The light which is forwardly diffused by the diffusing liquid crystalline material is incident on the reflector and, dependent on the angle of incidence, it will be reflected or not reflected. In the transparent state of the liquid crystalline material, the light is passed towards the absorbing element for that part of the incident light which would yield reflections within the viewing angle. In the diffusing state of the liquid crystalline material, all the light is diffused in the layer, and the angle of incidence on the display panel is hardly important. Now, much more light will be incident on the reflector at large angles of incidence, so that the white state will be observed as being very bright.

A further drawback of the display device known from U.S. Pat. No. 5,408,344 is that a prism plate is active in one direction only. If an even distribution of the reflections is desired, it is not sufficient to provide prisms in a single direction, but relatively complicated structures are to be used. This drawback is obviated by an embodiment of the reflective flat-panel display device in which the reflector comprises a stack of dielectric layers and behaves as a cut-off filter.

Dielectric layers reflect rotational-symmetrically. Moreover, this aspect of the present invention is based on the recognition that, for a dielectric stack behaving as a cut-off filter, a maximal quantity of light will be passed upon a substantially perpendicular incidence for a given wavelength range, whereas substantially all the light will be reflected from a given angle of incidence $\theta_c$. The wavelength at which the transmission is still 50% for perpendicular incidence is referred to as the cut-off wavelength. Above this wavelength, there is reflection, whereas light having shorter wavelengths will be passed.

The reference $\theta_c$ is understood to mean the angle of incidence within the display panel on the relevant means.

A further embodiment of the reflective flat-panel display device according to the invention is characterized in that 500 nm $\leq \lambda_c \leq$ 650 nm for the cut-off wavelength $\theta_c$ of the cut-off filter.

A satisfactory white state, a satisfactory black state and an optimum contrast of the display device can be realized at a cut-off wavelength within the above-mentioned interval.

Another embodiment of the reflective flat-panel display device according to the invention is characterized in that the reflector has at least one pair of cholesteric layers which are reflective in the same wavelength range and have opposite directions of polarization rotation.

A cholesteric layer is a liquid crystalline layer having a cholesteric ordering. This means that the molecules of the material spontaneously order in solution to a helical or helix-like structure having a pitch p. After such a solution has been provided as a thin, active layer between two parallel substrates, the helix-like structure is directed in such a way that the axis of the helix will be transverse to the layer.

When an unpolarized beam is incident on a cholesteric polarizer, the levorotatory and the dextrorotatory circularly polarized beam components will be separated from each other. In fact, a beam component having the direction of rotation which corresponds to the direction of the helix will be reflected, whereas the beam component having the other direction of rotation will be passed. Whether a beam component is passed or not passed is, however, not only determined by the direction of rotation but also by the wavelength of the incident beam. The reflection wavelength $\theta_0=\frac{1}{2}$ $(n_o+n_e)$ p. Only the part of the beam component having the direction of rotation corresponding to the direction of the pitch and being within the wavelength band $\theta_0$ will be reflected. Since the light should not be polarized in the application described above, there should always be two cholesteric layers per wavelength range, namely a levorotatory and a dextrorotatory layer so that both directions of polarization, i.e. the full beam, will be reflected within the relevant wavelength range.

Another embodiment of the display device according to the invention is characterized in that the reflector is a holographic liquid crystalline material.

A holographic liquid crystalline material is understood to mean a PDLC layer in which a refractive index modulation is produced because the photopolymerization has taken place in a three-dimensional intensity distribution realized by interfering light beams.

An example of such an element is described in the article: "Optimization of holographic PDLC for reflective color display applications" by K. Tanaka et al. in SID 95 DIGEST, pp. 267–270.

Another embodiment of the reflective flat-panel display device according to the invention is characterized in that the means comprise an angle-dependent diffusor.

An angle-dependent diffusor may be used instead of an angle-dependent reflector. An example of an angle-dependent diffusor is described in, for example, the article "A novel polymer film that controls light transmission" by M. Honda et al. in Progress in Pacific Polymer Science 3 (1994), pp. 159–169.

An angle-dependent forward diffusor is transmissive to all angles of incidence but has a diffusing effect within a given angular range. After this diffusion, a large part of the diffused light reaches the substrate-air interface on which total internal reflection will occur, so that the light will eventually reach the exit face of the display panel.

The diffusor may also be used in combination with, for example, one of the above-mentioned angle-dependent reflectors. In that case, the reflection occurs on this reflector instead of on the air-substrate interface. The forward diffusor is then arranged, for example, between the liquid-crystalline material and the angle-dependent reflector.

The diffusor may also be a backward diffusor. This means that the diffusor has the effect of a diffusing reflector for a given range. The diffusor may be situated, for example, between the liquid crystalline layer and the second substrate. In that case, neither an angle-dependent reflector nor a substrate-air interface are necessary.

In all these possibilities, the diffusor ensures that the ultimately reflected light is diffuse light.

Another embodiment of the reflective flat-panel display device according to the invention is characterized in that the diffusor is anisotropic gel.

An anisotropic gel is very suitable for this use, inter alia, because it may be implemented as a very thin film, and is known per se from, for example, European Patent Specification 0 451 905 (U.S. Pat. No. 5,188,760).

Another embodiment of the reflective flat-panel display device according to the invention is characterized in that the diffusor is an oriented diffusing liquid crystalline material.

In this case, a given orientation of the liquid crystalline material is frozen.

A further embodiment of the reflective flat-panel display device according to the invention is characterized in that the display device includes an extra reflector.

The extra reflector ensures that the reflection of light having wavelengths falling outside the wavelength bands, in which the angle-dependent reflector or the angle-dependent dependent diffusor are active, is optimized. In this way, an optimum luminance is obtained through a large wavelength range, so that unwanted color effects are suppressed.

The use of an internal and an extra reflector, which may be external or internal, yields more freedom in considering which fraction of the light must be reflected internally and which fraction remains to be reflected by the extra reflector.

If the total reflection is partly ensured by a specular reflector, a diffusor is preferably used in combination therewith so as to ensure that the reflection is diffuse at the angles at which this is possible. Within the viewing angle, the diffusor should be transparent, whereas outside this angle, i.e. at oblique angles, it should function as a diffusor.

The extra reflector may be, for example, a specular reflector, such as a prism foil, or an angle-dependent diffuse reflector, an example of which was mentioned hereinbefore. If the extra reflector is a diffuse reflector, the extra diffusor may be dispensed with.

These and other aspects of the invention are apparent from and will be elucidated with reference to the embodiments described hereinafter.

DETAILED DESCRIPTION OF THE PREFERRED EMBODIMENTS

Figure 1A:
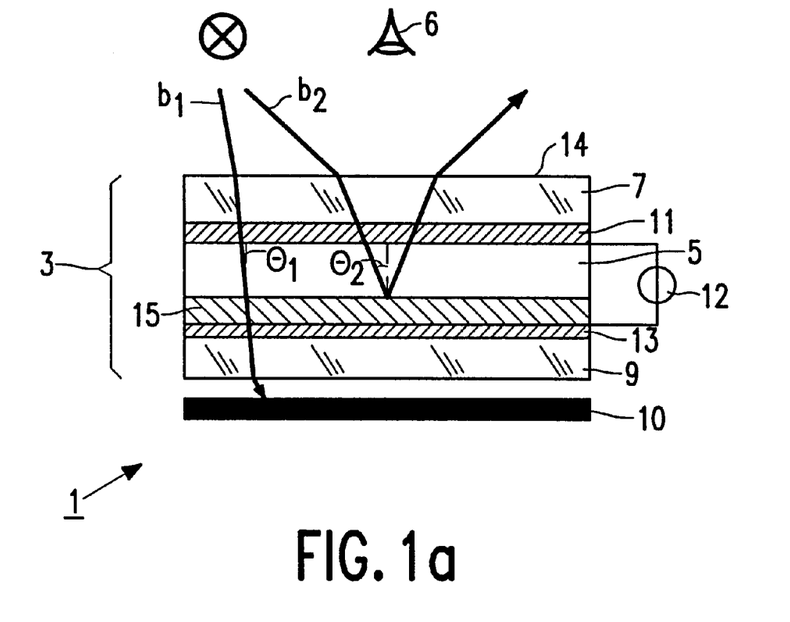
FIGS. 1(a) and 1(b) show embodiments of a reflective flat-panel display device according to the invention, provided with an angle-dependent reflector in the dark and the bright state, respectively, the absorbing element being situated outside the display panel.
Figure 1B:
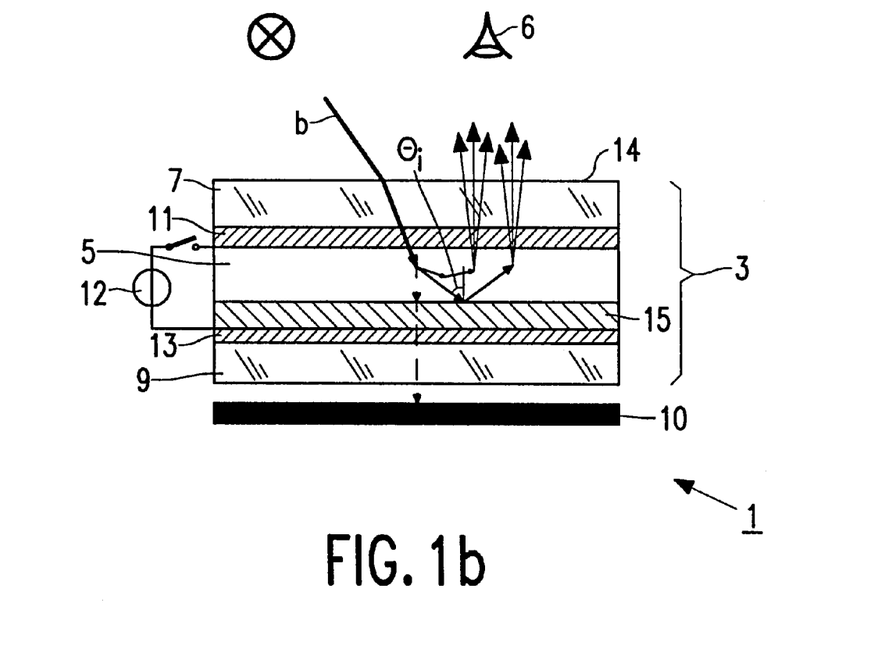

The flat-panel display device 1 shown in FIGS. 1(a) and 1(b) comprises a diffusing display panel 3. Such a display panel comprises a first substrate 7 and a second substrate 9 enclosing a diffusing liquid crystalline layer 5, for example, a PDLC layer (polymer dispersed liquid crystal) as an optically active medium. The PDLC layer consists of, for example, a liquid crystalline material which is dispersed in the form of drops in a transparent polymer material. Moreover, an electrode layer 11, 13 is situated between each of the substrates 7, 9 and the layer 5. The liquid crystalline layer is divided into pixels which are driven by the electrodes by means of a voltage source 12. Within pixels for which no voltage is applied across the electrode layers, as in FIG. 1(b), the molecules within the drops have a given net orientation, but the orientation among the drops themselves is different. These pixels are in diffusing state. When a voltage is applied to the electrodes (FIG. 1(a)), the molecules will direct themselves in accordance with the same orientation within the corresponding pixels. These pixels are in a transparent state. For the sake of simplicity, the Figures show the full PDLC layer 5 in the same state.

The display panel 3 of the display device 1 further includes means which ensure that light having an angle of incidence which is larger than $\theta_c$ is reflected, whereas light which is incident at a smaller angle of incidence will be passed and absorbed by an absorbing element 10. In this way, a relatively dark black state is obtained in the viewing direction for the viewer. In FIGS. 1(a) and 1(b) the absorbing element 10 is situated outside the display panel 3.

The display device may be illuminated, for example by means of ambient light. In many cases, this light includes directed illumination such as, for example, from a lamp. The device may also be illuminated by means of peripheral illumination. For example, the light may be coupled into the second substrate which then functions as a waveguide. In the drawings, the illumination, directed or undirected, is diagrammatically denoted by the reference numeral 8.

The means for reflecting light may be an angle-dependent reflector 15 which is present between the PDLC layer 5 and the second substrate 9. When a light beam is incident on the display panel 3, the light reaches the PDLC layer 5 first.

FIG. 1(a) shows an embodiment in which the PDLC layer is in a transparent state, whereas FIG. 1(b) shows an embodiment in which the PDLC layer is in a diffusing state.

When the layer 5 is in a transparent state (FIG. 1(a)), the light beams $b_1$, and $b_2$ are passed unhindered to the reflector 15. The reference $b_1$ denotes a light beam having an angle of incidence $\theta_1$ which is smaller than $\theta_c$, and the reference $b_2$ denotes a light beam having an angle of incidence $\theta_2$ which is larger than $\theta_c$, $\theta_c$ is the critical angle as from which reflection occurs. Light having an angle of incidence which is smaller than $\theta_c$ will be passed. If $b_1$ is incident on the reflector 15, then this light will be passed by the reflector 15 towards the absorbing element 10 and will thus be absorbed. A conventional value for $\theta_c$ is 20°–25°. In air, this corresponds to a viewing angle of approximately 30°–40° for the viewer 6. If $b_2$ is incident on the reflector 15, then this light will be reflected, again reach the PDLC layer 5 and will be passed unhindered towards the exit face 14 of the display device 1. For the viewer 6, the transparent state of the pixels of the PDLC layer 5 thus corresponds to the dark state of the display panel 3. The radiation incident within the viewing angle of a viewer 6 is absorbed, whereas the radiation incident outside this viewing angle will be reflected from the viewing angle.

When the layer 5 is in a diffusing state (FIG. 1(b)), the light incident on the display device 1 is diffused in the layer 5. This Figure shows only one light beam b, because the diffusion within the PDLC layer applies to all directions of incidence and, consequently, should not be distinguished from each other. Due to the diffusion within the PDLC layer, the beam incident on the reflector 15 has all directions of incidence. Light which is incident on the reflector 15 at an angle of incidence $\theta_i$ which is larger than $\theta_c$ will be reflected again, whereas light having angles of incidence which are smaller than $\theta_c$ will be passed. On its way to the exit face 14, the light reflected on the reflector 15 will be diffused again within the PDLC layer. The result is that a considerable part of the light incident on the display panel will occur in the viewing direction of the viewer 6. The display panel is then in the bright state.

The spatial angle which is bounded by $\theta_c$ is relatively small with respect to the total spatial angle, so that a relatively small quantity of light will be lost for the bright state when realizing a satisfactory dark state within the viewing angle of the viewer.

Figure 2A:
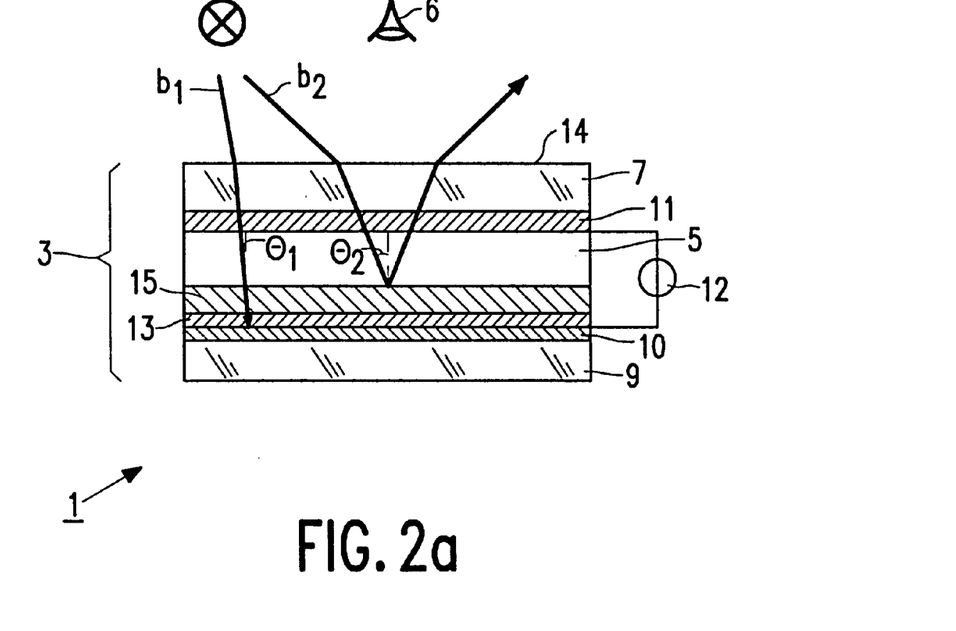
FIGS. 2(a) and 2(b) show embodiments of a reflective flat-panel display device according to the invention, provided with an angle-dependent reflector in the dark and the bright state, respectively, the absorbing element being situated within the display panel.
Figure 2B:
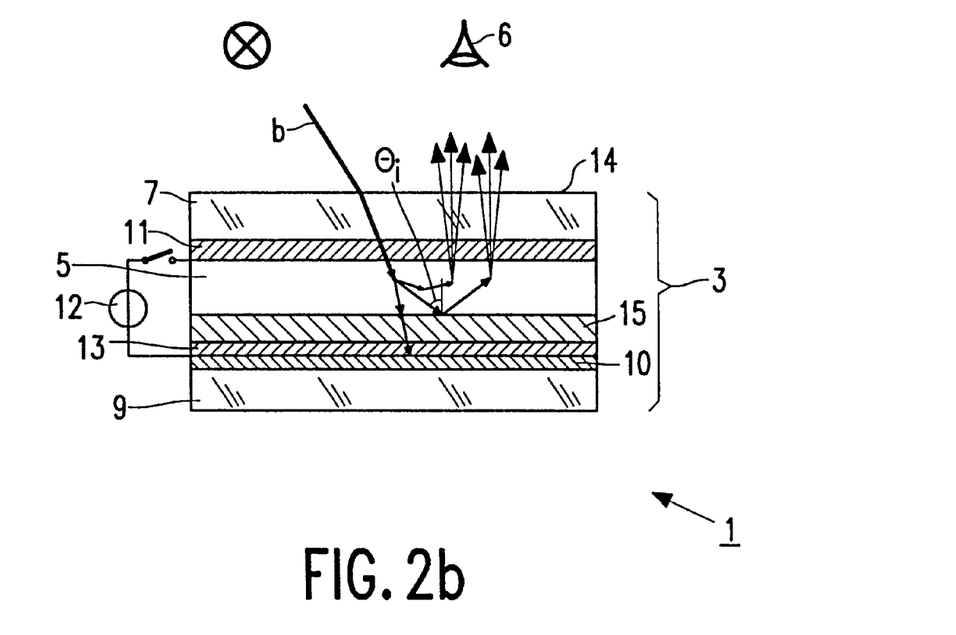

FIGS. 2(a) and 2(b) show embodiments for the dark and bright state, respectively, of the display panel, in which the absorbing element 10 is situated in the display panel 3. The electrode and absorption function may be combined in a single layer, for example, in a black chromium layer. When the absorbing element is integrated in the display panel, the switches and addressing lines of the display panel may be burned in under the electrodes of the reflective pixels, so that a relatively high aperture can be realized.

A very suitable reflector is a stack of dielectric layers which behaves as a cut-off filter. Such a stack reflects in an angle-dependent manner. A cut-off filter is a filter which passes a maximal quantity of light of a part of the spectrum for a given wavelength range, while substantially the full spectrum will be reflected from a given angle of incidence $\theta_c$. The wavelength at which the transmission is still 50% for perpendicular incidence is referred to as the cut-off wavelength. There is reflection above this wavelength, whereas light having shorter wavelengths will be passed.

The angle dependence of a dielectric reflector is, however, not the same for all wavelengths and is generally considered to be a drawback. However, this embodiment of the present invention is based on the recognition that the wavelength-dependent angle dependence can be utilized to realize a bright display device which, moreover, has a relatively satisfactory dark state.

$\theta_c$ can be chosen by means of the number of layers and the material of which the layers are made.

Figure 6:
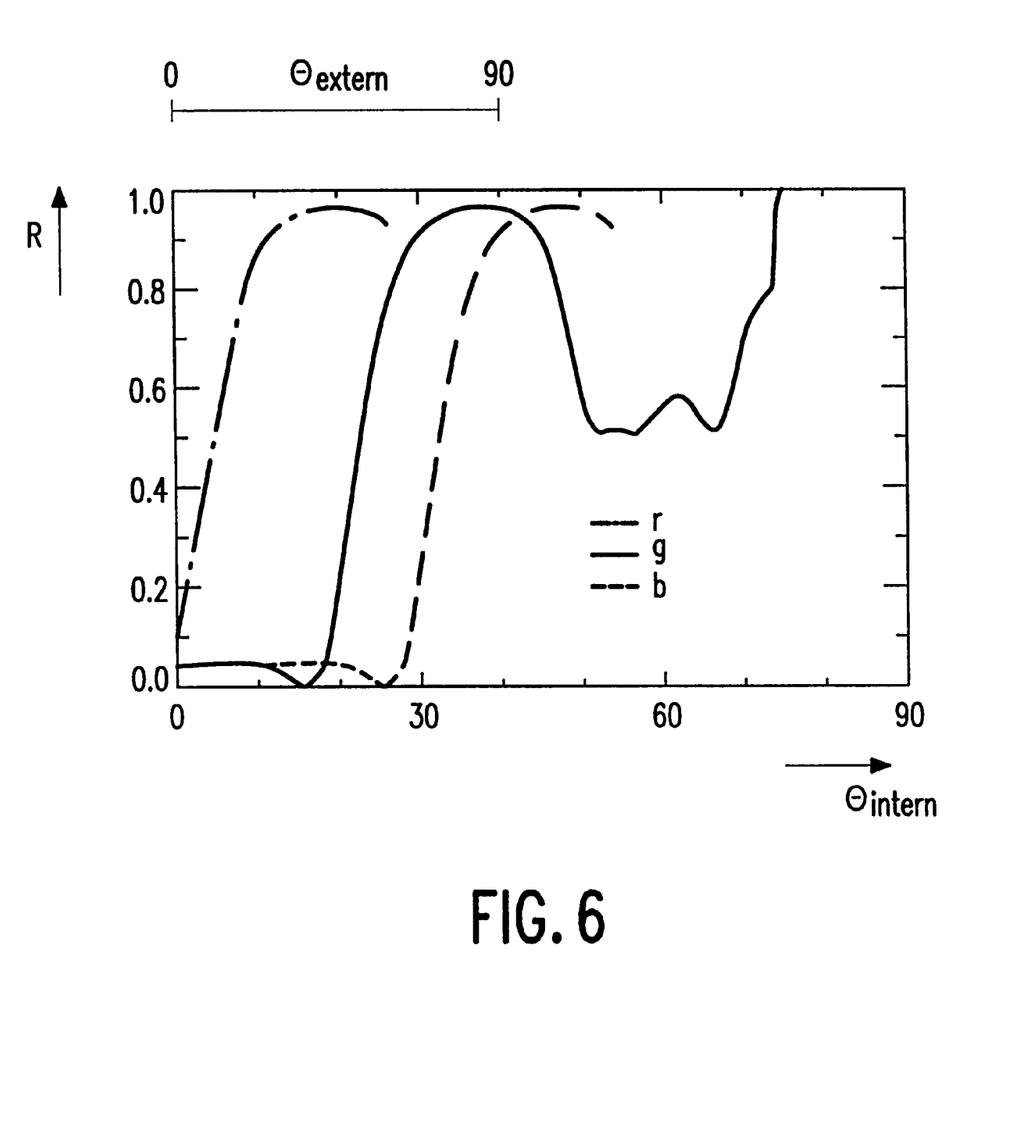
FIG. 6 shows a graph in which the reflection characteristic for a dielectric stack having a cut-off wavelength of 560 nm is represented for red, blue and green light as a function of the internal and external angles of incidence.

A very suitable reflector is a stack of dielectric layers whose cut-off wavelength $\lambda_c$ ranges between 500 nm and 650 nm. Such a reflector allows combination of a satisfactory white state, a satisfactory black state and an optimum contrast. At small angles of incidence, the reflector described is transmissive to blue and green and, as much as possible, to red. For larger angles of incidence, both red, blue and green light are reflected. FIG. 6 shows a reflection characteristic of a dielectric stack having a cut-off wavelength of 560 nm as a function of the internal and the external angles of incidence. The external angle of incidence is the angle measured on the exit face 14 of the display panel. The internal angle of incidence is the angle measured on the reflector within the display panel. The stack may be considered to be a short-wavelength pass filter.

Another embodiment of an angle-dependent reflector is constituted by a stack of at least two cholesteric layers. A cholesteric layer is a liquid crystalline layer having a cholesteric ordering. This means that the molecules of the material spontaneously order in solution to a helical or helix-like structure having a pitch p. After such a solution has been provided as a thin, active layer between two parallel substrates, the helix-like structure is directed in such a way that the axis of the helix will be transverse to the layer.

When an unpolarized beam is incident on a cholesteric polarizer, the levorotatory and dextrorotatory circularly polarized beam components will be separated from each other. In fact, a beam component having the direction of rotation which corresponds to the direction of the helix will be reflected, whereas the beam component having the other direction of rotation will be passed. Whether a beam component is passed or not passed is, however, not only determined by the direction of rotation but also by the wavelength of the incident beam. The reflection wavelength $\lambda_o=\frac{1}{2}(n_o+n_e)$ p. Only the part of the beam component having the direction of rotation corresponding to the direction of the pitch and being within the wavelength band $\lambda_o$ will be reflected.

Since the light should not be polarized in the application described above, there should always be two cholesteric layers per wavelength range, namely a levorotatory and a dextrorotatory layer so that both directions of polarization, i.e. the full beam, will be reflected within the relevant wavelength range. There will thus always be an even number of cholesteric layers in the stack.

An angle-dependent reflector may be alternatively constituted by a layer of a holographic liquid crystalline material. Such a material is known, for example, from the publication "Optimization of holographic PDLC for reflective color display applications" by K. Tanaka et al. in SID 95 Digest, pp. 267–270. Such a reflector consists of a polymer matrix in which liquid crystalline drops are ordered in surface areas. This surface area structure is obtained by means of photopolymerization-phase separation on the basis of a holographic technique. The reflection wavelength is determined by the angles at which the holographic illumination is performed.

The means for reflecting may comprise an angle-dependent diffusor 17 instead of an angle-dependent reflector 15. The diffusor may be either a forward or a backward diffusor.

Figure 3A:
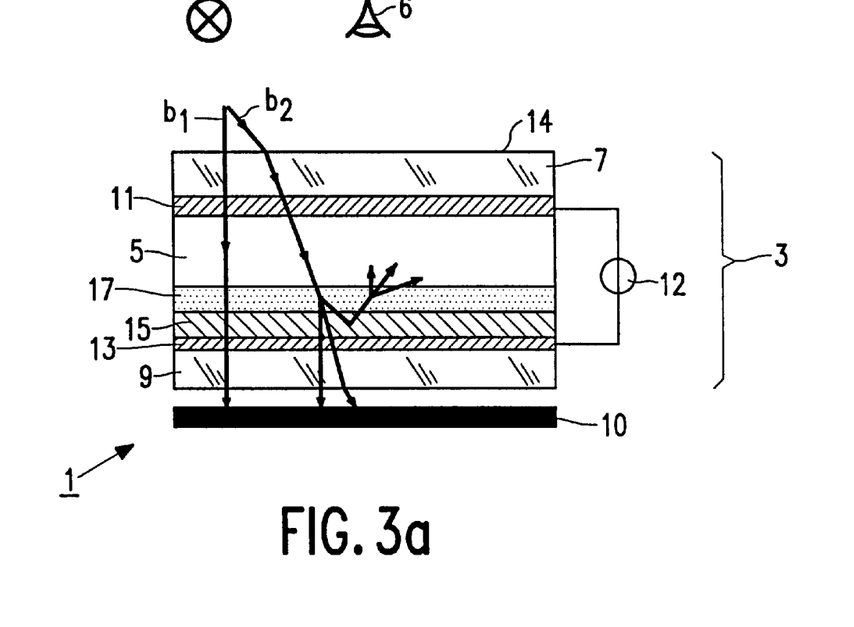
FIGS. 3(a), 3(b), 3(c) and 3(d) show some embodiments of a reflective flat-panel display device according to the invention, provided with an angle-dependent diffusor.
Figure 3B:
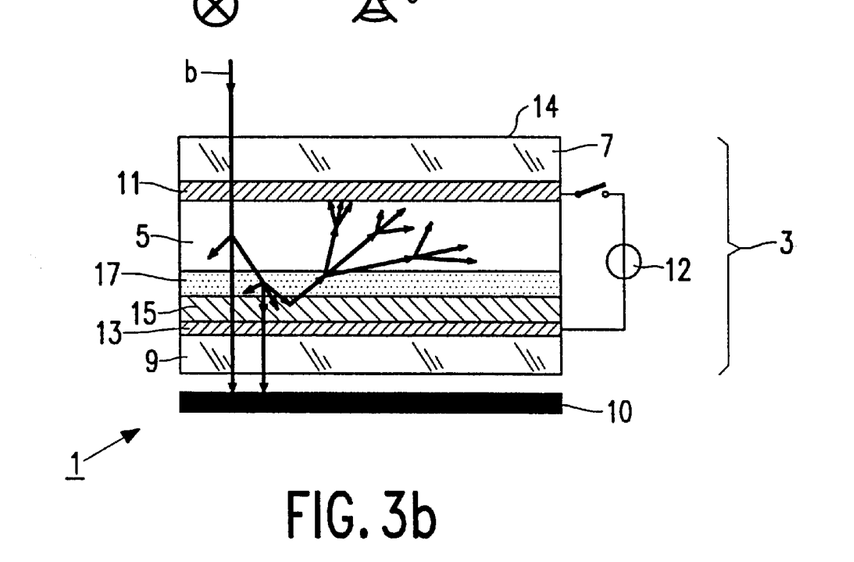

An angle-dependent forward diffusor passes all angles of incidence but operates as a forward diffusor in a given angular range. Outside this range, the incident light is passed substantially undisturbed. In combination therewith, reflection should occur elsewhere in the device for the radiation diffused within the relevant angular range. FIGS. 3(a) and 3(b) show an embodiment for the transparent and the diffusing states, respectively, of the PDLC layer 5 in which the reflection is ensured by an angle-dependent reflector 15.

When the display panel is in a transparent state (FIG. 3(a)), a beam $b_1$ having an angle of incidence which is smaller than $\theta_d$, the critical angle as from which diffusion occurs, will be passed towards the absorbing element 10. A beam $b_2$ having an angle of incidence which is larger than $\theta_d$ will be diffused in the diffusor 17. Subsequently, the light is incident on the reflector 15. Light rays having an angle of incidence which is smaller than $\theta_c$ will be passed towards the absorbing element 10, whereas light rays having an angle of incidence which is larger than $\theta_c$ will be reflected. Again, diffusion will occur in the diffusor 17 for angles of incidence which are larger than $\theta_d$.

When the display panel is in a diffusing state (FIG. 3(b)), additional diffusion will occur in the PDLC layer and already all angles of incidence will be present in the light incident on the diffusor and coming from the PDLC layer.

Figure 3C:
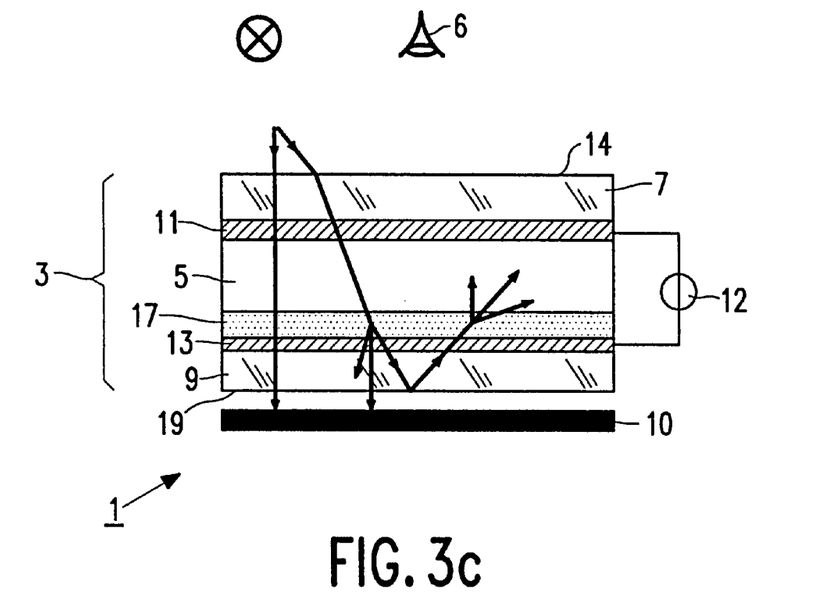
Figure 3D:
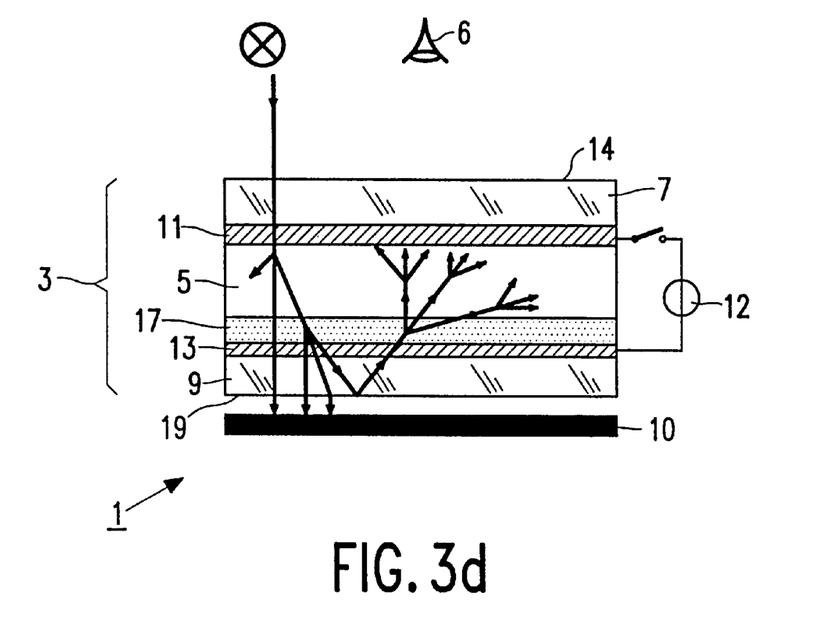

FIGS. 3(c) and 3(d) show the case for the transparent and diffusing states of the display panel in which the reflection is ensured by the interface 19 between the second substrate 9 and air. The diffusion is analogous to that shown in FIGS. 3(a) and 3(b). Now, reflection occurs in the form of total internal reflection on the interface 19 instead of on an angle-dependent reflector.

In FIGS. 3(a) to 3(d), the absorbing element 10 may be alternatively arranged within the display panel instead of outside this panel.

There are several possibilities for the angle-dependent diffusor. A first possibility for an angle-dependent diffusor is an anisotropic gel. An example thereof is described in EP 0 451 905, (U.S. Pat. No. 5,188,760), to which reference is made for more details.

In another possibility, the diffusor comprises an oriented liquid crystalline material. This is, for example, a PDLC layer in which a given orientation of the molecules is frozen.

Figure 4:
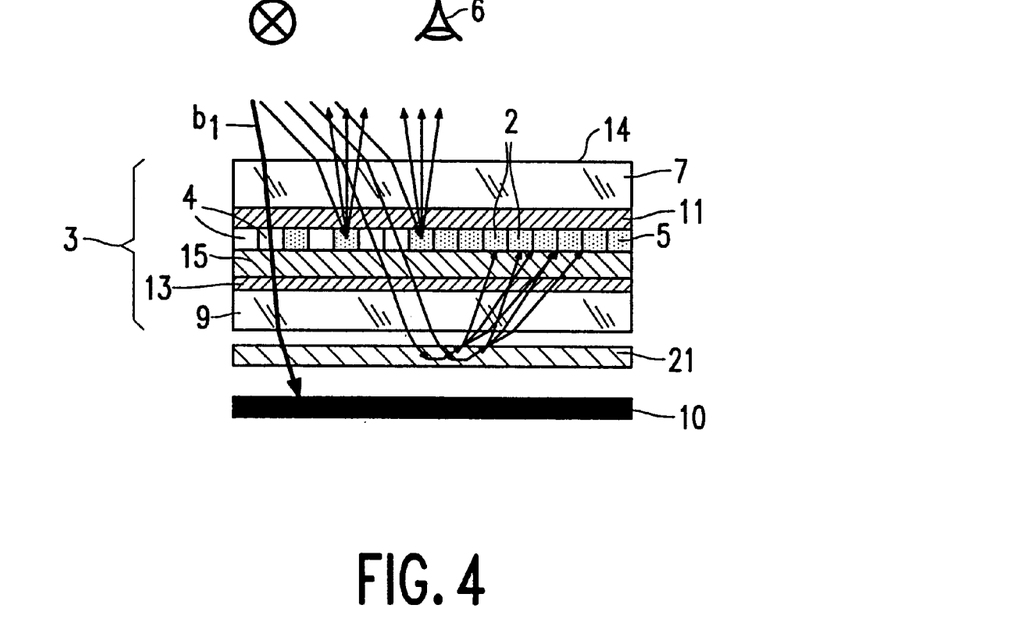
FIG. 4 shows an embodiment of a reflective flat-panel display device according to the invention, provided with an angle-dependent diffuse reflector.
Figure 5:
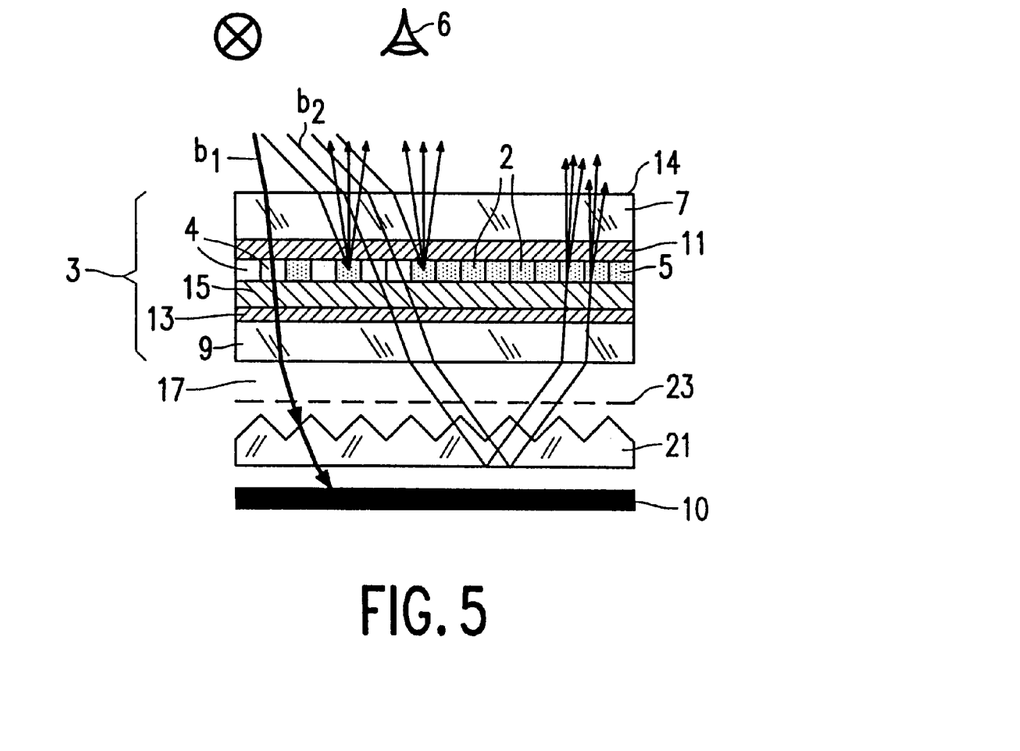
FIG. 5 shows an embodiment of a reflective flat-panel display device according to the invention, provided with a prism foil.

Moreover, the display device 1 may be as yet provided with an extra reflector 21. FIGS. 4 and 5 show some embodiments of this reflector.

In FIG. 4, the extra reflector 21 is implemented as an angle-dependent diffuse reflector. Such a reflector is not necessarily an external reflector but may be alternatively arranged within the display panel, for example, between the angle-dependent reflector 15 and the second substrate 9. The reflector 21 may be alternatively arranged on the lower side of the second substrate 9.

In FIG. 5, the extra reflector 21 is implemented as a prism plate and thus necessarily as an external reflector. Moreover, a prism plate is a specular reflector. If the total reflection is partly ensured by a specular external reflector, a diffusor 23 is preferably used in combination therewith so as to ensure that the reflection is diffuse at the angles at which this is possible. Within the viewing angle, the diffusor should be transparent, whereas outside this angle, i.e. at oblique angles, it should function as a diffusor. Such a diffusor may consist of, for example, a transparent plate provided with a PDLC layer which is transparent within the viewing angle and has a diffusing effect outside this angle. This is a PDLC layer having an angle-dependent haze.

The embodiments shown in FIGS. 3(a) to 3(d) may also be provided with an extra reflector between the second substrate 9 and the absorbing element 10 or within the display panel itself.

The diffusor 23 is denoted by means of a broken line. The diffusor 23 may be alternatively arranged between the prism foil 21 and the absorbing element 10.

The extra reflector 21, either external or not external, ensures that the reflection of light having wavelengths falling outside the wavelength bands, in which the angle-dependent reflector 15 or the angle-dependent diffusor 17 are active, is optimized so that unwanted color effects are suppressed. Since the greater quantity of light is already reflected by the internal reflector, the occurrence of shadow images will be suppressed also in this case in which an external reflector is used. In fact, the extra reflector only acts on the light whose wavelength was not suitable for the angle-dependent reflector or the angle-dependent diffusor. The diffusion which is illustrated on the right-hand side of the display device shown in FIG. 5 will only be applicable to a very limited quantity of light. Moreover, due to the diffuse character of this reflection, all angles of incidence will be present in the reflected light, so that a part of this light will remain outside the viewing angle.

In FIGS. 4 and 5, the PDLC layer 5 is shown as a layer having both diffusing pixels 2 and transparent pixels 4. A light beam $b_1$ having an angle of incidence $\theta_1$ which is smaller than $\theta_c$ will be passed by a transparent pixel 4 and also by the angle-dependent reflector 15 and the extra reflector 21, so that the light beam will be absorbed by the absorbing element 10. Light which is incident at these angles on transparent pixels will not come within the viewing angle of the viewer. Consequently, these pixels are in the dark state for the viewer who is watching the panel within the viewing angle. For a pixel in the diffusing state, the light diffused within the pixel will be incident on the angle-dependent reflector at substantially all angles of incidence. The light for which the angle of incidence is large enough to be principally reflected, but whose wavelength is not exactly suitable for the angle-dependent reflector, will as yet be reflected towards the extra reflector 21.

In FIG. 4, the absorbing element 10 may be arranged within the display panel if the diffuse reflector 21 is situated within this panel.

If the extra reflector is a diffuse reflector, the extra diffusor 23 may be dispensed with.

We claim:

1. A reflective flat-panel display device comprising a display panel which is suitable for modulating an illumination beam with image information, said panel having a light incident side and an opposite side, the display panel comprising a diffusing liquid crystalline material, a first substrate on the light incident side and a second substrate on the opposite side enclosing the liquid crystalline material, and reflecting means between said first and second substrates which reflect light which is incident at an angle larger than a given angle of incidence $\theta_c$ and pass light which is incident at an angle smaller than said given angle of incidence $\theta_c$, said display device further comprising an absorbing element which absorbs light passed by said reflecting means.

2. A reflective flat-panel display device as claimed in claim 1, wherein the reflecting means comprise an angle-dependent reflector which is situated between the liquid crystalline material and the second substrate.

3. A reflective flat-panel display device as claimed in claim 2, wherein the reflector comprises a stack of dielectric layers and behaves as a cut-off filter.

4. A reflective flat-panel display device as claimed in claim 3, wherein 500 nm $\leq \lambda_c \leq$ 650 nm for the cut-off wavelength $\lambda_c$ of the cut-off filter.

5. A reflective flat-panel display device as claimed in claim 2, wherein the reflector has at least one pair of cholesteric layers which are reflective in the same wavelength range and have opposite directions of polarization rotation.

6. A reflective flat-panel display device as claimed in claim 2, wherein the reflector comprises a holographic liquid crystalline material.

7. A reflective flat-panel display device as claimed in claim 1, wherein the reflecting means comprise an angle-dependent diffusor.

8. A reflective flat-panel display device as claimed in claim 7, wherein the diffusor is an anisotropic gel.

9. A reflective flat-panel display device as claimed in claim 7, wherein the diffusor comprises a diffusing liquid crystalline material.

10. A reflective flat-panel display device as claimed in claim 1, wherein the display device includes an extra reflector between said display panel and said absorbing element.

* * * * *